Patented Oct. 7, 1958

2,855,388

TERPOLYMER SYSTEMS CONTAINING LACTONE GROUPS

Earl C. Chapin, Springfield, and Richard F. Smith, Ludlow, Mass., assignors to Monsanto Chemical Company, St. Louis, Mo., a corporation of Delaware No Drawing. Application January 10, 1955
Serial No. 481,005

6 Claims. (Cl. 260—78.5)

This invention relates to new terpolymer systems. More particularly the invention relates to terpolymer systems containing alcohol groups and gamma lactone groups.

One object of this invention is to provide new terpolymer systems.

A further object is to provide terpolymer systems containing alcohol groups.

Another object is to provide terpolymer systems containing gamma lactone rings.

These and other objects are attained by copolymerizing a styrene compound, an unsaturated alcohol and a diester of a butene dioic acid at temperatures of 100–250° C. under autogenous pressure.

In the following examples which are illustrative of this invention, parts are parts by weight.

Example I

Mix together 50 parts of allyl alcohol monomer, 25 parts of dimethyl maleate monomer, 25 parts of styrene and 3 parts of ditertiarybutyl peroxide. Heat the mixture in a closed pressure vessel at about 200° C. for about 1 hour. The product is a pale amber syrup comprising polymer dissolved in unreacted monomers. Remove the monomers by vacuum distillation at about 150° C. to obtain a pale yellow brittle solid soluble in dimethyl formamide, acetone, hot xylene, and in xylene-butanol mixtures. Infrared analysis proves the presence of benzene rings, ester groups, gamma lactone rings and alcohol groups in the polymer. By titration it is found that there are about 2% by weight of free alcohol groups in the polymer.

Example II

Mix together 33 parts of styrene monomer, 33 parts of dimethyl maleate, 33 parts of allyl alcohol and 3 parts of ditertiarybutyl peroxide. Heat the mixture in a closed pressure vessel at 200° C. for about 1 hour. The product is a clear substantially colorless syrup comprising polymer dissolved in unreacted monomers. Remove the monomers by vacuum distillation at about 150° C. to obtain a clear colorless brittle solid soluble in dimethyl formamide, acetone, xylene and xylene-butanol mixtures. Infrared analysis shows the presence of benzene rings, ester groups, gamma lactone rings and alcohol groups in the polymer. By titration the amount of free alcohol groups is found to be about 1.7% by weight of the polymer.

Example III

Mix together 50 parts of allyl alcohol, 16 parts of styrene and 32 parts of dimethyl maleate with 3 parts of di-tertiary butyl peroxide. Heat the mixture in a closed pressure reaction vessel at 200° C. for about 1 hour. The product is a clear colorless syrup comprising polymer dissolved in unreacted monomers. Remove the monomers by vacuum distillation at about 150° C. to obtain a soft pale yellow solid soluble in methanol, dimethyl formamide, acetone, xylene-butanol mixtures and hot xylene. The polymer contains about 1.8% free alcohol groups by weight.

The three components of the systems of this invention are allyl or methallyl alcohol, styrene or a styrene derivative and a dialkyl ester of a butene dioic acid. The allyl component may vary between 1 and 15% by weight of the terpolymer, the styrene component between 10 and 90% by weight of the terpolymer and the ester component between 10 and 90% by weight of the terpolymer. Among the materials comprising the styrene component are styrene, ring substituted alkyl styrenes including ortho, meta, and para methyl, ethyl, butyl, etc. styrenes, ortho-para or ortho-meta dimethyl or diethyl styrenes, ring substituted chlorostyrenes including the mono-, di- and tri-chlorostyrenes, ring substituted alkyl chlorostyrenes such as ortho methyl para chlorostyrene and mixtures of the above.

The ester component comprises the dialkyl esters of butene dioic acids in which the alkyl groups may contain from 1 to 18 carbon atoms and may be the same or different alkyl groups. The butene dioic acids include maleic, fumaric, citraconic, mesaconic and itaconic acids.

In preparing the terpolymers of this invention, the three monomeric components should be mixed together with or without the inclusion of a free radical polymerization initiator and the mixture should be heated at 100–250° C. in a closed reaction vessel under autogenous pressure. The reaction should be run for from 15–75 minutes to obtain conversions ranging from 30–70% depending on the conditions chosen. The reaction may also be carried out in the presence of small amounts of an organic solvent relatively inert to the reacting ingredients. Solvents such as xylene and benzene are particularly useful for this purpose.

Free radical polymerization initiators useful for producing the polymers of this invention are di-tertiarybutyl peroxide, benzoyl peroxide, tertiarybutyl perbenzoate, pinacolone peroxide, etc. The amount of initiator may range from 0.1 to 5 parts per 100 parts of monomer mixture.

The products of the polymerization step are syrupy liquids which comprise a solution of a terpolymer in unreacted monomer and solvent if a solvent is used. The terpolymer is easily recovered from the syrup by removing the unreacted monomer and solvent by vacuum distillation at temperatures up to about 250° C. The terpolymers range from soft solids to hard brittle materials. They contain little or no color although a faint yellowish tinge is sometimes discernible. Infrared analysis shows that the terpolymers all contain appreciable quantities of gamma lactone groups in addition to the aromatic rings, ester groups and alcohol groups present in the raw materials.

The products of this invention are particularly useful in coating compositions as the main resin constituent thereof with relatively minor amounts of other coating resins such as alkyd resins, phenol, urea and melamine formaldehyde coating resins, epoxy resins, etc. Or they may be used in relatively small amounts as modifiers for the other coating resins.

Various pigments, fillers, dyes and other conventional additives may be added to solutions of the terpolymers in organic solvents to provide coating compositions. Since the terpolymers are soluble in ketones, aromatic hydrocarbons, some alcohols and dimethyl formamide, these solvents or a combination of them with conventional diluents may be used as the vehicle for coating compositions involving the terpolymers.

The foregoing description and particularly the examples are illustrative of this invention and it is obvious that many variations may be made within the spirit and scope thereof.

What is claimed is:

1. A terpolymer of an unsaturated alcohol, a styrene and a dialkyl ester of a butene dioic acid, the amount of unsaturated alcohol in the terpolymer varying between 1 and 15% by weight, the amount of styrene component varying between 10 and 90% by weight and the amount of ester component varying between 10 and 90% by weight, the unsaturated alcohol being a member of the group consisting of allyl alcohol and methallyl alcohol and mixtures thereof, the styrene component being a member of the group consisting of styrene, ring substituted alkyl styrenes, ring substituted chlorostyrenes, ring substituted alkyl chlorostyrenes and mixtures thereof and the ester component being a member of the group consisting of dialkyl esters of maleic, fumaric, citraconic, mesaconic and itaconic acids and mixtures thereof, the alkyl groups in said ester component containing from 1 to 18 carbon atoms.

2. A terpolymer as in claim 1 wherein the unsaturated alcohol is allyl alcohol.

3. A terpolymer as in claim 1 wherein the ester component is dimethyl maleate.

4. A terpolymer as in claim 1 wherein the styrene component is styrene.

5. A terpolymer of 1–15% by weight of allyl alcohol, 10–90% by weight of styrene and 10–90% by weight of dimethyl maleate.

6. A process for preparing a terpolymer comprising by weight between 1 and 15% of an unsaturated alcohol, between 10 and 90% of a styrene component and between 10 and 90% of an ester component which comprises mixing the three components and heating the mixture at 100–250° C. under autogenous pressure, the unsaturated alcohol being a member of the group consisting of allyl and methallyl alcohols and mixtures thereof, the styrene component being a member of the group consisting of styrene, ring substituted alkyl styrenes, ring substituted chlorostyrenes, ring substituted alkyl chlorostyrenes and mixtures thereof, and the ester component being a member of the group consisting of the dialkyl esters of maleic, fumaric, citraconic, mesaconic, and itaconic acids and mixtures of said esters, said alkyl groups in said esters containing from 1 to 18 carbon atoms.

References Cited in the file of this patent

UNITED STATES PATENTS

| | | |
|---|---|---|
| 2,507,871 | Tawney | May 16, 1951 |
| 2,606,172 | Tawney | Aug. 5, 1952 |
| 2,617,787 | Tawney | Nov. 11, 1952 |